United States Patent [19]

Vives

[11] Patent Number: 4,487,401

[45] Date of Patent: Dec. 11, 1984

[54] DEVICE FOR HEATING, MIXING AND/OR TRANSFERRING METALS IN THE LIQUID STATE

[75] Inventor: Charles Vives, Chateaurenard, France

[73] Assignee: Societe de Vente de L'Aluminum Pechiney, Lyons, France

[21] Appl. No.: 442,276

[22] Filed: Nov. 17, 1982

[30] Foreign Application Priority Data

Dec. 8, 1981 [FR] France .................. 81 23330

[51] Int. Cl.³ .............................. F27D 11/06
[52] U.S. Cl. .................. 266/234; 75/68 R; 164/504; 222/593; 266/237; 373/142; 417/50
[58] Field of Search ............... 266/234, 237; 75/68 R; 373/142; 417/50; 222/593; 164/504

[56] References Cited

FOREIGN PATENT DOCUMENTS 1600320 12/1968 France .
353121 10/1974 U.S.S.R. .............. 266/234

Primary Examiner—M. J. Andrews
Attorney, Agent, or Firm—McDougall, Hersh & Scott

[57] ABSTRACT

The device includes a chamber for holding a metal in the liquid state having a lower section that communicates with three channels which converge to form a single passage wherein two of the channels include inductor cores around which the channel forms an annular zone to contain the metal. In the presence of alternating currents of variable voltage and phase, the inductors can be energized separately or simultaneously to perform the heating, mixing and transferring operations within the channels.

10 Claims, 3 Drawing Figures

DEVICE FOR HEATING, MIXING AND/OR TRANSFERRING METALS IN THE LIQUID STATE

BACKGROUND OF THE INVENTION

The present invention relates to the field of metallurgy, and in particular, to foundry practice wherein a device for heating, mixing and/or transferring metals in a liquid state applies certain effects of electromagnetism.

It is known in metallurgical practice that to obtain a semi-finished product, the metal must pass through a melting phase which is intended to place the metal in a suitable state for subsequent treatment including mixing of the metal with purification elements, refining, alloying or shaping the metal by transfer and solidification in different types of molds. In short, there are many operations that require heating, mixing and transferring means to place metals in a liquid form.

It is true that those skilled in the art who have been faced with these problems for many decades have found numerous solutions by resorting, among other things, to electromagnetic means.

Thus, French Pat. No. 1,600,320 discloses a furnace containing a metal wherein the bottom portion of the furnace includes three channels. Two of the channels are surrounded by closed magnetic circuits and coils which induce a current to heat and mix the metal. The third channel which is provided with an extraction pipe, is equipped at the point of intersection with the other two channels with an electromagnet having a field that acts on the induced current to create the force necessary to move the metal toward the interior of the furnace.

Such a device, however, has the following disadvantages. The device requires two different magnetic systems—one formed by the circuits and coils which generate heat and perform the mixing, and the other magnetic system formed by the electromagnet that assures the transfer of the metal. This arrangement requires the mounting of two separate electric feed lines with their associated measuring and control devices.

Moreover, the electromagnet is a source of considerable energy loss, both in the copper by the Joule effect, and in the iron by hysteresis and Foucault currents; in part, because it is fed with an alternating current. The induced currents which pass through the metal interact with the magnetic leaks of the circuits to produce an intense mixing of the liquid, hence disturbances occur at the level of the vehicled outputs and in the materials forming the channels. The energy dissipated by these leaks when added to the energy required to perform the normal functions of heating, mixing and transferring operations produces a relatively high consumption of electricity.

That device, while allowing for separate control of the heating and transferring operations, is nevertheless complex and a high energy consumer.

SUMMARY OF THE INVENTION

The present invention was developed to assure separate or simultaneous heating, mixing and transferring of metals into the liquid state. According to one embodiment, the device includes a chamber for containing the metal having a lower section that connects with three channels that converge at one point. One channel can be extended to the interior of the chamber by a pipe system that passes to the exterior of the device. The device is characterized by the fact that each of the non-extendable channels presents, along its axis, a cavity in the shape of the finger of a glove, on the inside of which the end of the core of an inductor is threaded. The inductor is energized by low frequency alternating current. On the outside of the cavity, the liquid occupies an annular zone. Both channels are designed so that relative to the cavities their axes are located in the same vertical plane and form an upwardly directed angle of less than 60° relative to horizontal.

Thus, the device according to the present invention takes the conventional shape of channel furnaces, but differs therefrom by the arrangement of the means intended to furnish the energy necessary for the heating operation and for moving the liquid. It will be understood that a plurality of channels and inductors can be used.

The above embodiment, however, includes two inductors each formed by an energizing coil comprising two wires rolled simultaneously and parallel on a cylinder. On the inside of the cylinder, a magnetic core is placed that has a symmetry of revolution and is formed from iron panels with oriented crystals. The windings are made so as to leave about one third of the length of the core bare at one end. If these inductors are energized by an electric alternating current with a frequency of 50 cycles, a magnetic field of a high radial component is created around the core and particularly in the bare or stripped section.

The arrangement of the inductors on each of the non-extendable channels, which start out from the bottom of the chamber, is original in that each channel defines along its axis a cavity in the shape of the finger of a glove, with the stripped ends of the inductors being threaded to the inside of the cavity and within each such channel the liquid metal occupies an annular zone.

Thus, when the inductors are energized with an electric alternating current, a radial magnetic component is created causing the simultaneous appearance of an electromagnetic force parallel to the axis of the finger of the glove, which tends to separate the metal from the end of the core, and of an induced current which, by the Joule effect, generates calories and forces of agitation within the metal. Regulation of the conditions of energizing and arranging the position of the channels controls the heating, mixing and propulsion operations.

DETAILED DESCRIPTION OF THE INVENTION

Figure 1:
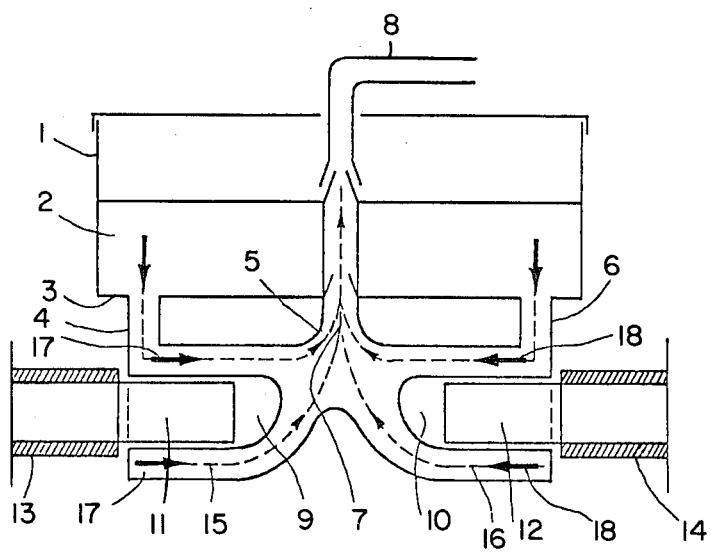
FIG. 1 is a side sectional view of one embodiment of the device according to the present invention.

FIG. 1 shows a chamber 1 containing an alloy 2 in the liquid state. The lower section 3 of the chamber communicates with three channels 4, 5 and 6 that converge at a point 7. Of these channels, one channel 5 can be extended through the interior of the chamber by a pipe line 8 passing through the upper portion of the chamber. The other two non-extendable channels 4 and 6 each form along their longitudinal axes, cavities 9 and 10 in the form of a glove finger with the ends of cores 11 and 12 of inductors 13 and 14, energizable by an alternating current being threaded within the respective cavity. About each cavity and within each channel 4 and 6, the liquid alloy occupies an annular zone 15 and 16. Channels 4 and 6 are designed so that the axes of the glove fingers are located in the plane of the sheet (FIG. 1) and are directed horizontally.

In operation, when both inductors 13 and 14 are operated on a 50 cycle current, at the same voltage and phase, under the action of the field originating from the cores 11 and 12, an induced current is formed to heat the metal and forces are directed along the direction of the arrows 17 and 18 which act on the annular zone 15 and 16 surrounding each core 11 and 12. This displaces the liquid toward the point of convergence 7 and moves the liquid out of the chamber 1 by way of the pipe line 8.

The channels have been designed in such a manner that the axes of the glove fingers are located in the same vertical plane and are directed upwardly so that the forces created will be directed toward the point of convergence 7 of the three channels and in the direction of propulsion of the metal toward the extendable channel 5. As a result, these forces can be used to extract the metal from the chamber 1 and to transfer the metal to a point of utilization, for example, to a mold. The axis of each glove finger forms, preferably with the horizontal plane, an angle ranging between 0° and 60°, which makes it possible to have a suitable degree of circulation in the channels at the point where the channels converge.

Depending on the characteristics of the electric currents that energize the inductors 13 and 14, different heating, mixing and transferring conditions of the liquid metal can be achieved.

In fact, when, for example, each of the inductors 13 and 14 is energized by currents of the same level in phase, the forces created in the annular zones 15 and 16 operate together to return the liquid metal via the extendable channels. Thus, at the same time, heating and transferring operations are performed.

Conversely, if each of the inductors 13 and 14 is energized by currents of the same voltage, but phase-shifted by 180°, the magnetic fields created are directed from one core to the other core, which prevents the buildup of the forces in a given direction. Thus, the device can be limited to the heating and mixing operations of the liquid metal.

Figure 2:
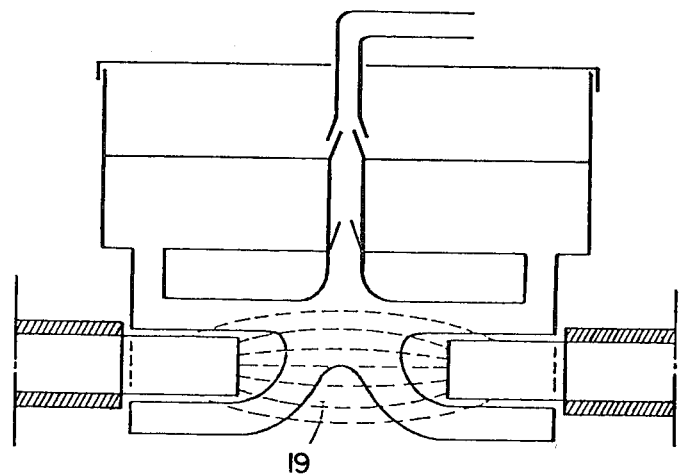
FIGS. 2 and 3 are operating diagrams of the embodiment shown in FIG. 1.

FIG. 2 shows an operating diagram of the installation when the inductors 13 and 14 are operated with an alternating current of the same voltage, but phase shifted by 180°. In this case, the magnetic field lines 19 originating from the cores 11 and 12 are elongated toward each other so that the transfer forces are eliminated and, besides the heat effect, a movement of the liquid perpendicular to the axis of the channels 4 and 6, and hence a mixing effect, will be produced.

Figure 3:
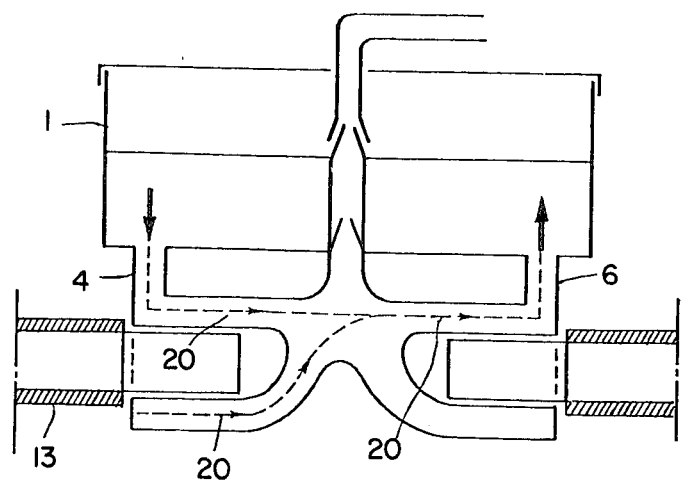

FIG. 3 shows an operating diagram of the installation when only the inductor 13 is energized. There is heating of the metal and circulation of the liquid from channel 4 toward channel 6 and the chamber 1 along the direction of the arrows 20.

It is understandable that by adjusting the phase-shifting of the currents that energize the inductors, it is possible, without altering the heating conditions, to change the mixing conditions and the forces of propulsion. It will be seen that there is the possibility of controlling at will the transfer of the liquid metal toward the exterior of the device, independently of the heating operation. It is likewise possible to only energize one of the inductors 13 or 14, in which case it is possible, while continuing the heating operation, to circulate the liquid metal from one to the other non-extendable channel 4 or 6.

Moreover, since the metal output is a function of the field created by the inductors 13 and 14, and the field leaks likewise are a function of the value of that field, it is possible to establish a relationship between those losses and the output. Thus, if these leaks can be measured, it is possible to determine and also to control the output. For this it suffices to place a coil on the outside of the chamber, and the field resulting from the leaks will induce a difference of potential in the coil that is proportional to the output. This induced current can serve to modulate the energizing current of the inductors and to give it such a value that it will correspond with the desired output.

A versatile system of control is offered that is protected from the corrosion phenomena caused by liquid metal. Other metal immersion systems do not have this advantage.

The present device, in addition to simple design, offers numerous other advantages. The energy output of the device ranges between 80 and 93% depending on the thickness of the walls of the chamber. The magnetic field emanating from the cores 11 and 12 is recovered almost entirely and is converted into heat energy and into useful forces. The arrangement of the inductors 13 and 14 away from the chamber avoids any heating and any danger of degradation. The inductors 13 and 14 are easily accessible and thus can be replaced easily in case of any incident.

Moreover, the metal output can be regulated and controlled in a simple manner with a reliable system protected from any deterioration by the heat of the corrosive action of the metal. The temperature of the metal, its mixing and the extraction output can be regulated in a simple and independent manner by suitably adjusting both the voltages and the phase shiftings of the energizing currents. Since the device only requires the electrical feeding of two inductors, it offers all the possibilities of remote control of temperature control systems and of the cooling speed, and allows for easy automation in continuous, semi-continous or pulsated installations. It can be applied to the processing of most metals and their alloys including aluminum, lead, tin, zinc, copper and the like.

The present invention can be better understood with reference to the following example.

EXAMPLE 1200 kilograms of an aluminum alloy in the liquid state was placed in a chamber having a capacity of 600 liters, at the base of which three channels 4, 5 and 6 with an inner diameter of 4 centimeters terminate. Two of the channels 4 and 6 have a horizontal component adjacent their point of convergence. The horizontal components of these channels form two cavities 9 and 10 in the form of a glove finger 36 cm long, with an inner diameter of 17 cm, a wall thickness of 1 cm, on the outside of each channel the liquid alloy occupies an annular zone 15 and 16 that is 3 cm wide.

An iron core 14 cm in diameter and 1000 cm in length is placed on the inside of each cavity. An inductor 13 or 14 formed from 100 meters of copper wire with a cross section of 0.6 cm$^2$ is wound on the core and is placed so as to leave one end of the core exposed over a length of 30 cm which engages the interior of the cavity.

With each one of the inductors 13 and 14 being energized by an alternating current of 50 cycles at a voltage of 200 volts, the metal is maintained at a temperature near 720° C.

With the currents in phase, the total power consumed is 40 KW, and a force is generated to produce 25,000 kg/hour of metal at a pressure of 6 M of Al.

By progressively increasing the phase shifting of the currents which energize the two inductors up to 180°, the output, pressure and consumed power are reduced to the following values:

$\phi = 45°$, power 40 KW, output 22,000 kg/hour, pressure 5 M of Al.

$\phi = 90°$, power 40 KW, output 20,000 kg/hour, pressure 4 M of Al.

For $\phi = 180°$ the output was zero, but a suitable mixing of the liquid was noted. The absence of energizing on one of the inductors led to a voltage of 200 volts and a consumed power of 20 KW with circulation of the liquid from one of the non-extendable channels to the other one, at a yield of 13,000 kg of Al per hour.

The device according to the invention is applied in metallurgy, particularly in foundry practice to keep metals in fusion, for their mixing with different elements and for their transfer to casting installations.

It will be understood that various changes and modifications may be made in the above described device without departing from the spirit of the invention, particularly as defined in the following claims.

That which is claimed is:

1. A device for heating, mixing and/or transferring metals in the liquid state comprising a chamber for holding the liquid, the lower section of said chamber communicating with a plurality of channels that converge at one point and which are formed to circulate the liquid, one of the channels being extendable into the interior of the chamber by a pipe that leads out of the chamber wherein each of the non-extendable channels defines a cavity along its axis, an inductor core being in communication with the interior of said cavity, said inductor core being energized by a low frequency alternating current, each non-extendable channel forming an annular zone about said cavity, the non-extendable channels being formed relative to the cavities whereby the axis of each channel is located in a vertical plane and forms relative to horizontal an upwardly directed angle of less than 60°.

2. The device according to claim 1 wherein the heating and transferring of liquid toward the extendable channel are performed by energizing the inductors with alternating currents of the same voltage in phase.

3. The device according to claim 1 wherein the heating and mixing of liquid are performed by energizing the inductors with alternating currents of the same voltage, said alternating currents being phase-shifted by 180°.

4. The device according to claim 2 wherein the rate of transfer of the liquid toward the extendable channel is controlled by the degree of phase-shifting of the currents which energize the inductors.

5. The device according to claim 1 wherein the heating and transferring from one non-extendable channel to another non-extendable channel are performed by energizing one of the inductors.

6. A device for heating, mixing and/or transferring metals in the liquid state comprising a chamber for holding the liquid, the lower section of said chamber communicating with three channels that converge at one point and which are formed to circulate the liquid, one of the channels being extendable into the interior of the chamber by a pipe that leads out of the chamber wherein each of the two non-extendable channels defines a cavity along its axis, an inductor core being in communication with the interior of said cavity, said inductor core being energized by a low frequency alternating current, each non-extendable channel forming an annular zone about said cavity, the non-extendable channels being formed relative to the cavities whereby the axes of the channels are located in the same vertical plane and form relative to horizontal an upwardly directed angle of less than 60°.

7. The device according to claim 6 wherein the heating and transferring of liquid toward the extendable channel are performed by energizing the inductors with alternating currents of the same voltage in phase.

8. The device according to claim 6 wherein the heating and mixing of liquid are performed by energizing the inductors with alternating currents of the same voltage, said alternating currents being phase-shifted by 180°.

9. The device according to claim 7 wherein the rate of transfer of the liquid toward the extendable channel is controlled by the degree of phase-shifting of the currents which energize the inductors.

10. The device according to claim 6 wherein the heating and transferring from one non-extendable channel to the other non-extendable channel are performed by energizing one of the inductors.

* * * * *